(12) United States Patent
Holman

(10) Patent No.: US 10,867,373 B2
(45) Date of Patent: Dec. 15, 2020

(54) DYNAMIC OVERLAY DISPLAY PROPERTIES ADJUSTMENT METHODS AND SYSTEMS

(71) Applicant: T-Mobile USA, Inc., Bellevue, WA (US)

(72) Inventor: Jacob Holman, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/378,551

(22) Filed: Apr. 8, 2019

(65) Prior Publication Data
US 2020/0320670 A1    Oct. 8, 2020

(51) Int. Cl.
G09G 5/02      (2006.01)
G06T 5/00      (2006.01)

(52) U.S. Cl.
CPC .................... *G06T 5/009* (2013.01)

(58) Field of Classification Search
CPC .... G09G 5/02; G09G 5/06; G09G 2320/0666; G09G 2340/06; G06T 11/001
USPC ........................................................ 345/589
See application file for complete search history.

(56) References Cited

U.S. PATENT DOCUMENTS

| 2007/0200938 A1* | 8/2007 | Kaku ............... H04N 1/3878 348/239 |
| 2010/0138475 A1* | 6/2010 | Frank ............... H04L 47/125 709/203 |
| 2014/0080428 A1* | 3/2014 | Rhoads ............ H04W 4/70 455/88 |
| 2016/0005201 A1 | 1/2016 | Kunkel et al. |
| 2016/0330493 A1* | 11/2016 | Chuah ............... G06T 17/20 |
| 2017/0032554 A1* | 2/2017 | O'Donovan ........ G06F 3/04842 |

* cited by examiner

Primary Examiner — Gordon G Liu
(74) Attorney, Agent, or Firm — Perkins Coie LLP

(57) ABSTRACT

Systems and methods for dynamically computing display properties of an overlay on a base image are disclosed. The method receives base image data and its properties, and overlay data and its position on the base image. The method identifies a set of pixels of the base image situated under at least a portion of the overlay. For each pixel in the set of pixels, the method computes a value of a display property of the pixel. The method then computes a reference display property value of the base image based on the computed display property values of pixels and computes a display property value of the overlay using the computed reference display property value of the base image. The method then assigns a display property of the overlay based on the computed display property value of the overlay.

20 Claims, 12 Drawing Sheets

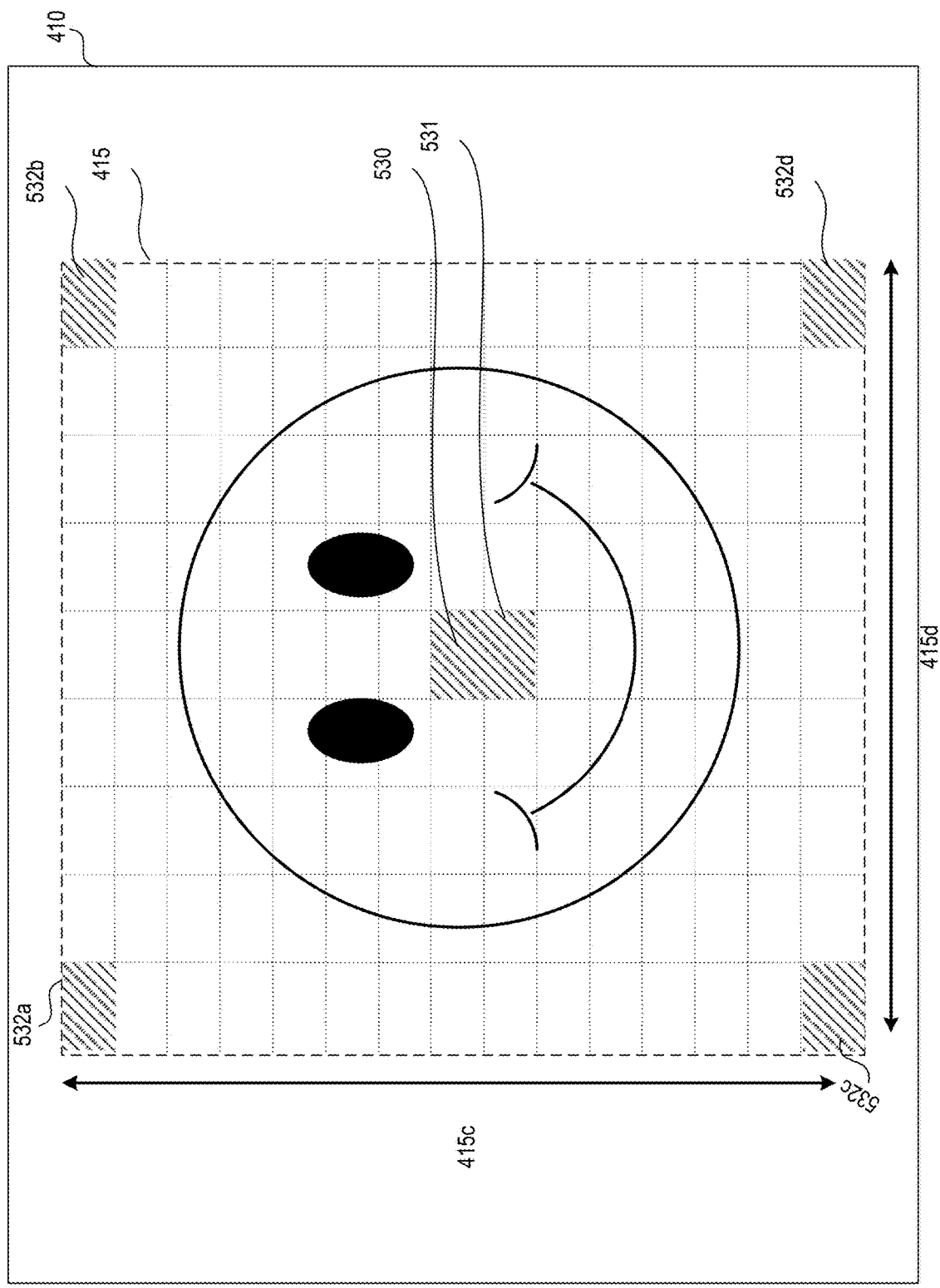

DYNAMIC OVERLAY DISPLAY PROPERTIES ADJUSTMENT METHODS AND SYSTEMS

BACKGROUND

Using current systems, to ensure that contents of an overlay (for example, an advertisement text) are visible and easily readable on a background (for example, an underlying image), mobile application creators have to manually adjust display properties of the overlay (for example, brightness or contrast) so that it is visible on a particular background, and create a combined image that includes the background and the overlay. The mobile application creators have to repeat these steps (adjust display properties of overlay and create a combined image) for each background. That is, if an overlay is to be included on five different backgrounds, then the mobile application creator has to evaluate the properties of each of the five backgrounds, create five different versions of the overlay by manually adjusting the properties of the overlay so that it is visible on each background, and create five separate combined images that include the overlay embedded on the background. This process consumes significant resources including computing resources, time resources, and financial resources expended when the mobile application creator generates a customized overlay and a customized combined image for each background. Further, any changes to an overlay (for example, change in text) or a background (for example, brightness) require that the mobile application creator start from scratch by creating a new customized overlay, manually modifying its properties to ensure that it is visible on each background, and creating a new combined image.

BRIEF DESCRIPTION OF THE DRAWINGS

FIGS. 5A-5G are display diagrams illustrating examples of identifying pixels for evaluation to compute adjusted display property values of an overlay before displaying it at a mobile device.

Figure 1:
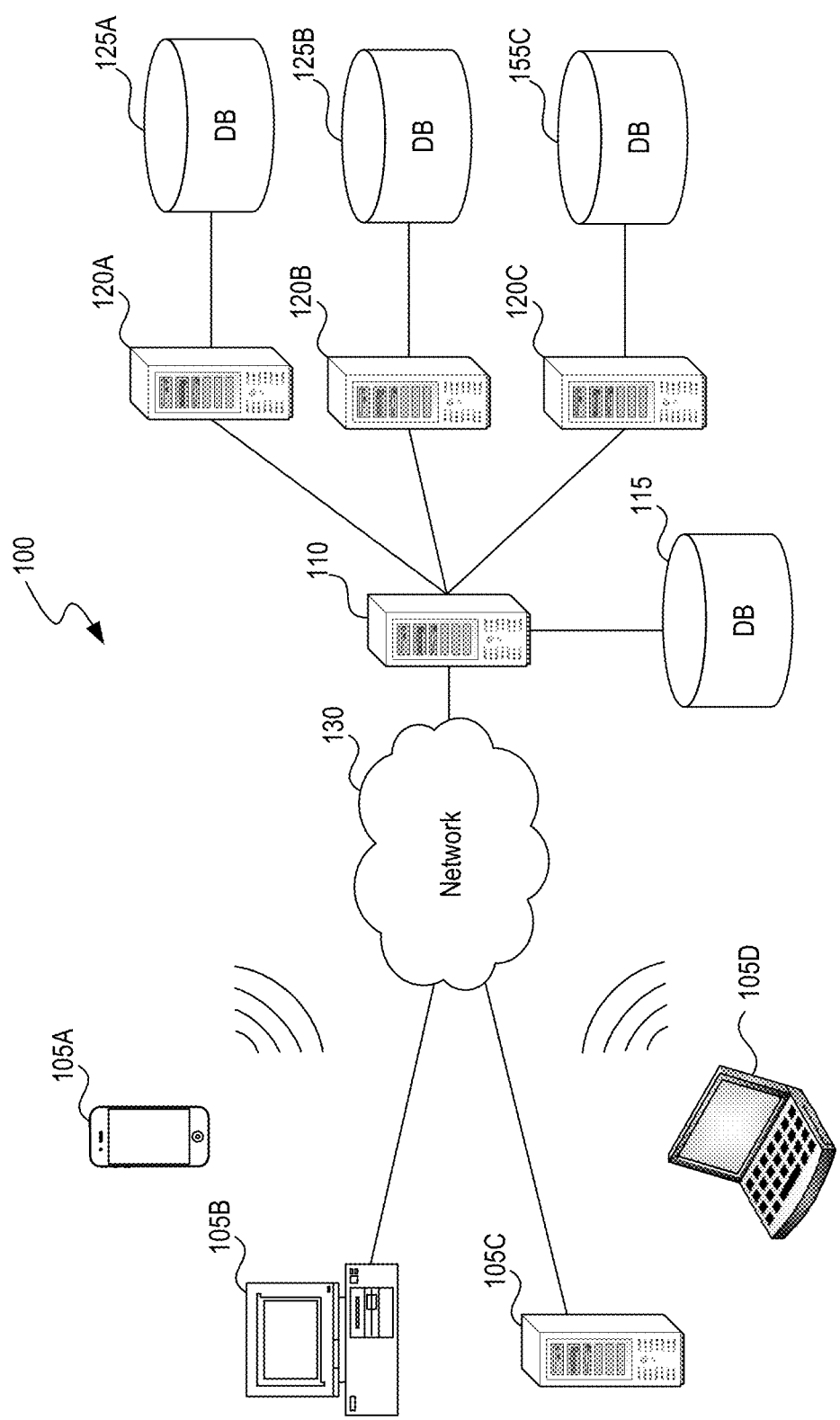
FIG. 1 is a block diagram illustrating an overview of an environment in which some implementations of the disclosed technology can operate.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Systems and methods disclosed herein enable mobile application creators to dynamically overlay content (for example, a text string) on top of a background (for example, a base image) without having to hard-code or bake in the overlay content in the background. The method receives information about a display background (underlying image) and a display foreground (overlay text). The method determines the location of the overlay and scans the underlying image pixels that will fall behind the overlaid text. The method then retrieves/determines information about one or more display properties (for example, brightness, color, intensity, contrast, and so on) for each scanned pixel. Using the pixel-level information, the method determines whether the underlying image is bright or not, and accordingly computes one or more corresponding property values (for example, brightness, color, intensity, contrast, and so on) for the overlaid text. The method can further customize the property values based on properties (for example, display properties, computing capabilities, and so on) of the mobile device where the overlaid text and underlying image are to be displayed. The method then adjusts the property values of the overlaid text before rendering the overlaid text on the underlying image at a mobile device.

In the following description, for the purposes of explanation, numerous specific details are set forth in order to provide a thorough understanding of implementations of the present technology. It will be apparent, however, to one skilled in the art that implementations of the present technology can be practiced without some of these specific details.

The techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The phrases "in some implementations," "according to some implementations," "in the implementations shown," "in other implementations," and the like generally mean the particular feature, structure, or characteristic following the phrase is included in at least one implementation of the present technology and can be included in more than one implementation. In addition, such phrases do not necessarily refer to the same implementations or different implementations.

Several implementations are discussed below in more detail, in reference to the figures. Turning now to the figures, FIG. 1 is a block diagram illustrating an overview of an environment 100 in which some implementations of the disclosed technology can operate. Environment 100 can include one or more client computing devices 105A-D. Client computing devices 105 can operate in a networked environment using logical connections 110 through network 130 to one or more remote computers, such as a server computing device.

In some implementations, server 110 can be an edge server which receives information about an overlay and a base image, and coordinates their display through other servers, such as servers 120A-C. Server computing devices 110 and 120 can comprise computing systems. Though each server computing device 110 and 120 is displayed logically as a single server, server computing devices can each be distributed computing environments encompassing multiple computing devices located at the same or at geographically disparate physical locations. In some implementations, each server 120 corresponds to a group of servers.

Client computing devices 105 and server computing devices 110 and 120 can each act as servers or clients to other server/client devices. Server 110 can connect to a database 115. Servers 120A-C can each connect to a corresponding database 125A-C. As discussed above, each server 120 can correspond to a group of servers, and each of these servers can share a database or can have its own database. Databases 115 and 125 can warehouse (e.g., store) information such as mobile device properties, display device properties, environment conditions, brightness thresholds, brightness parameters, and other information. Though databases 115 and 125 are displayed logically as single units, databases 115 and 125 can each be distributed computing environments encompassing multiple computing devices, can be located within their corresponding servers, or can be located at the same or at geographically disparate physical locations.

Network 130 can be a local area network (LAN) or a wide area network (WAN), but it can also be other wired or wireless networks. Network 130 may be the Internet or some other public or private network. Client computing devices 105 can be connected to network 130 through a network interface, such as by wired or wireless communication. While the connections between server 110 and servers 120 are shown as separate connections, these connections can be any kind of local, wide area, wired, or wireless network, including network 130 or a separate public or private network.

Figure 2:
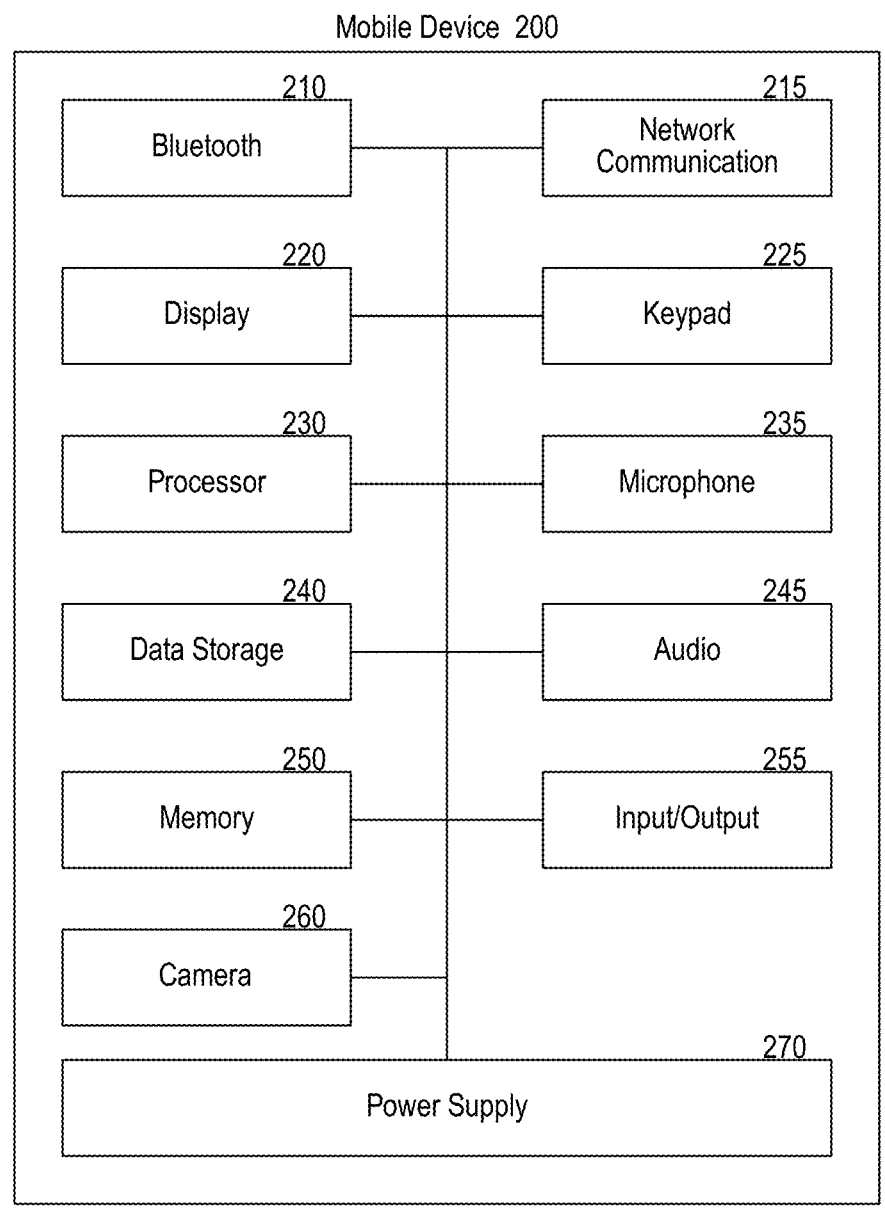
FIG. 2 is a block diagram of a representative mobile device that may serve as a handset on which the overlay is displayed.

FIG. 2 is a block diagram of a representative mobile device that may serve as a handset on which an overlay is displayed in accordance with embodiments herein. Mobile device 200 typically includes a processor 230 for executing processing instructions, a data storage medium component 240 (e.g., hard drive, flash memory, memory card, etc.), volatile memory and/or nonvolatile memory 250, a power supply 270, one or more network interfaces (e.g., Bluetooth Interface 210 or Network Communication Interface 215, which enables the mobile phone to communicate by transmitting and receiving wireless signals using licensed, semi-licensed or unlicensed spectrum over a telecommunications network), an audio interface 245, a display 220, a keypad or keyboard 225, a microphone 235, one or more cameras 260, and other input and/or output interfaces 255. The various components of the mobile device may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. The stored information may include one or more SIP or Diameter protocol clients capable of generating, transmitting and interpreting syntactically correct SIP or Diameter protocol messages. SIP clients permit the mobile device to register with and communicate via the IMS network. The stored information may further include instructions, which when executed by the processor 230, perform operations for dynamically computing properties of a display foreground on a display background, as described in detail below.

Mobile device 200 may be virtually any device for communicating over a wireless network. Such devices include application servers or mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals ("SETs"), Personal Digital Assistants ("PDAs"), radio frequency devices, infrared devices, handheld computers, laptop computers, wearable computers, tablet computers, pagers, integrated devices combining one or more of the preceding devices, and/or the like.

Mobile device 200 may connect to a telecommunications network via a trusted radio access network (RAN) or an untrusted RAN. A single mobile device may be capable of using one or both types of RANs. The RANs may use any wireless communications and data protocol or standard, such as GSM, TDMA, UMTS, EVDO, LTE, GAN, UMA, Code Division Multiple Access ("CDMA") protocols (including IS-95, IS-2000, and IS-856 protocols), Advanced LTE or LTE+, 5G, Orthogonal Frequency Division Multiple Access ("OFDM"), General Packet Radio Service ("GPRS"), Enhanced Data GSM Environment ("EDGE"), Advanced Mobile Phone System ("AMPS"), WiMAX protocols (including IEEE 802.16e-2005 and IEEE 802.16m protocols), Wireless Fidelity ("Wi-Fi"), any of the IEEE 802.11 WLAN protocols, High Speed Packet Access ("HSPA"), (including High Speed Downlink Packet Access ("HSDPA") and High Speed Uplink Packet Access ("HSUPA")), Ultra Mobile Broadband ("UMB"), SUPL, and/or the like.

Figure 3:
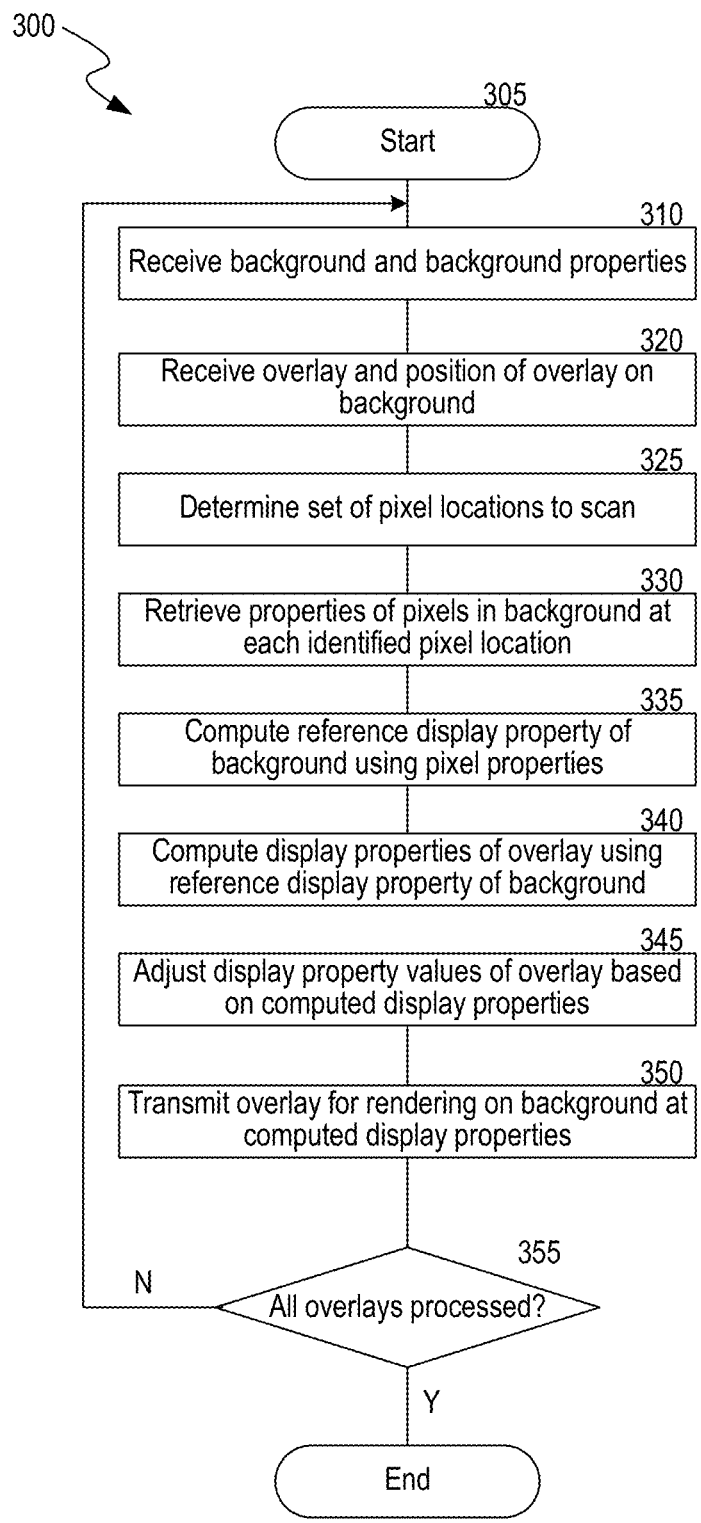
FIG. 3 is a flow diagram illustrating a process of dynamically adjusting display properties of an overlay before displaying it at a mobile device.
Figure 4A:
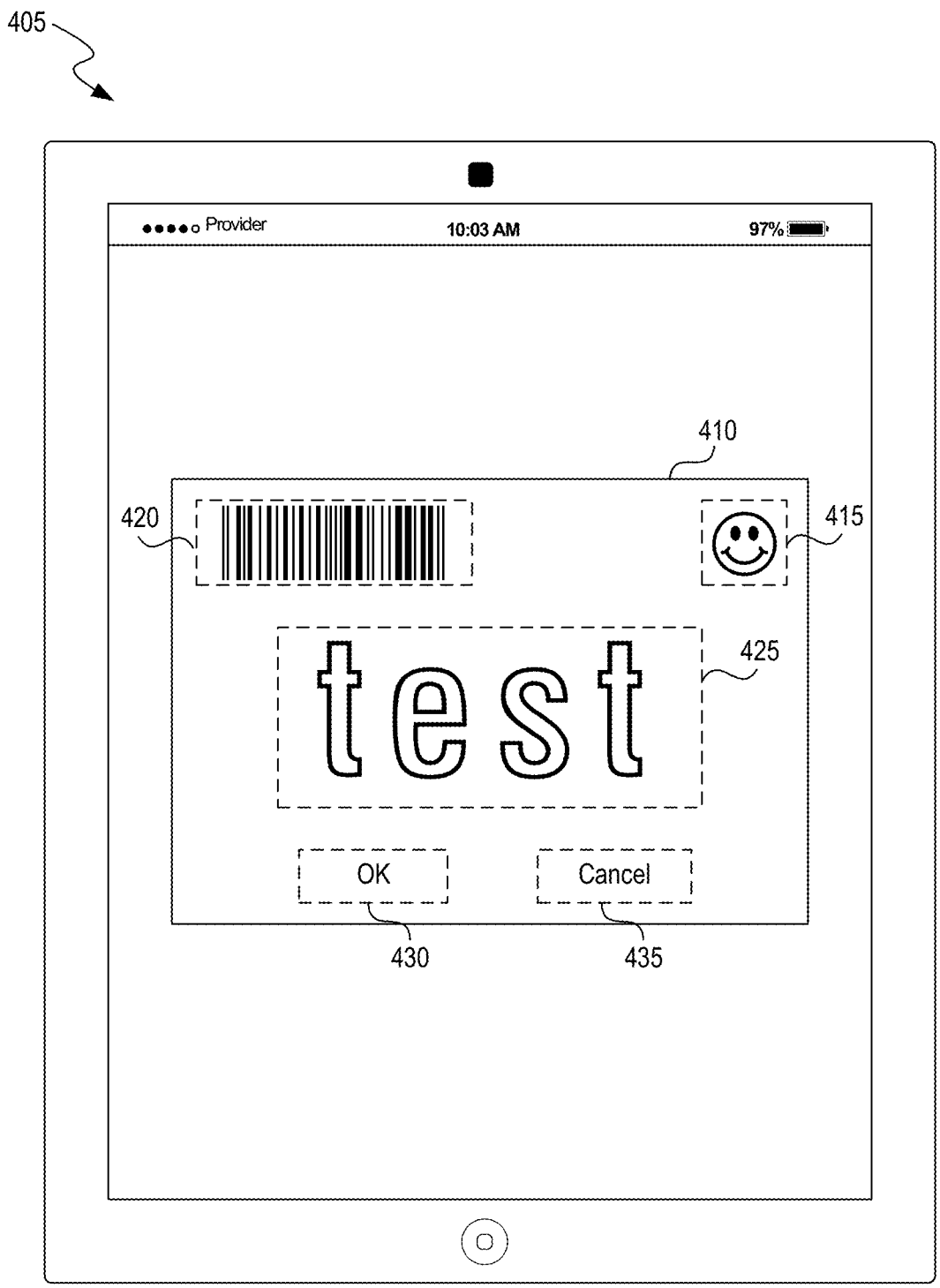
FIGS. 4A-4B are display diagrams illustrating examples of overlays on a background at a mobile device.

FIG. 3 is a flow diagram illustrating a process 300 of dynamically adjusting display properties of an overlay before displaying it at a mobile device. Process 300 begins at block 305 and proceeds to block 310 where it receives data comprising a display background and properties of the display background. A display background can comprise one or more of the following display artifact types including, but not limited to, images, text strings, emojis/emoticons, buttons, bar codes, matrix barcodes, videos, and so on. Properties of a background include dimensions (length and width), scale, zoom, type, colors, grayscale, brightness, contrast, luminosity, intensity, and so on. At block 315, process 300 evaluates whether all overlays that are to be displayed on the background are processed. When all overlays are processed, process 300 returns to block 305 and begins the process for another background and overlay combination. On the other hand, when all overlays are not processed, process 300 proceeds to block 320 where it receives data comprising a display foreground and a location/position of the display foreground on the display background. A display foreground can comprise one or more of the following display artifact types including, but not limited to, images, text strings, emojis/emoticons, buttons, bar codes, matrix barcodes, videos, and so on. FIG. 4A illustrates a display device 405 (for example, a mobile device) comprising a display background (for example, a base image) 410 and multiple display foregrounds (overlays): emoticon 415, barcode 420, text string 425, and buttons 430 and 435.

Figure 4B:
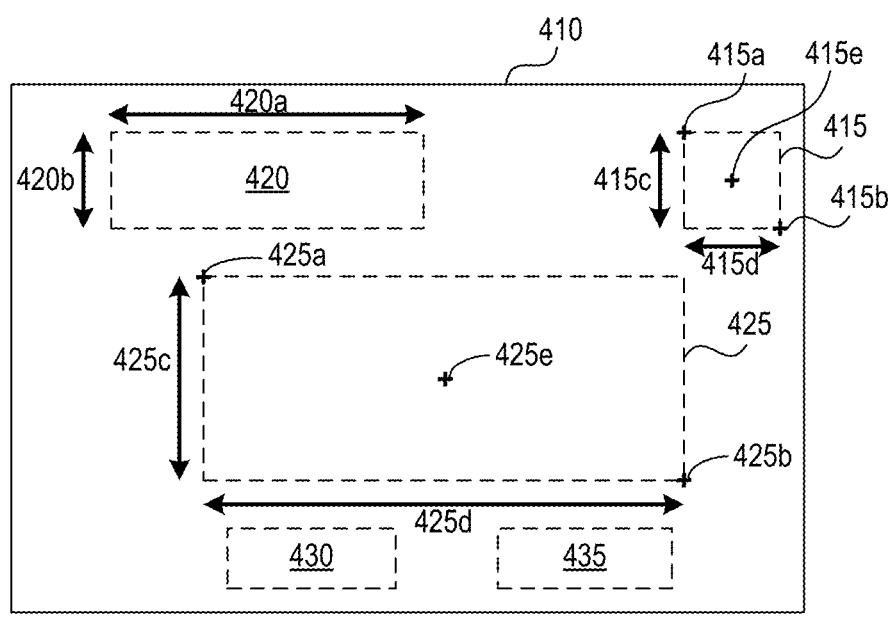

The position of the display foreground can be represented in the form of coordinates (for example, x and y coordinates), relative position on the display background (for example, 15 pixels south and 10 pixels east from the top left corner of the display background), position on the display screen (for example, top banner of a mobile screen), and so on. In some implementations, process 300 computes the position of the overlay using computer-implemented image analysis techniques. Process 300 can further receive and/or identify one or more of the following properties of the display foreground: dimensions (length and width), scale, zoom, type, colors, grayscale, brightness, contrast, luminosity, intensity, and so on. In some implementations, process 300 identifies properties of the display foreground based on a type of the display background and/or a type of the display foreground. FIG. 4B illustrates an intermediate artifact created by process 300 upon processing the base image 410 and its multiple overlays. For example, for an emoticon overlay 415, process 300 identifies the height 415c, width 415d, location of center 415e, location of top left corner 415a, and location of bottom right corner 415b. For a barcode overlay 420, process 300 identifies the width 420a and the height 420b. And for a text string overlay 425, process 300 identifies the height 425c, width 425d, location of center 425e, location of top left corner 425a, and location of bottom right corner 425b.

Returning to FIG. 3, after receiving information about a display foreground, process 300 proceeds to block 325 where it identifies a set of pixels of the display background that will be evaluated to compute display property values of the display foreground. In some implementations, the set of pixels comprises pixels situated directly behind at least a portion of the display foreground. For example, when processing overlay 425, process 300 identifies pixels of the display background at positions that fall within the dotted line box 425. Process 300 can identify the set of pixels based on one or more of the following parameters: type of the display foreground, dimensions of the display foreground, position of the display foreground, dimensions of the display background, data comprising the display background, properties of the display background, properties of a graphical display unit where the display background and display foreground will be displayed, properties of a mobile device that includes the graphical display unit, a telecommunications service provider plan subscribed to by a user of the mobile device, properties of the user of the mobile device, visual properties of surroundings of the graphical display unit, and so on. For example, when mobile device is outdoors and the environment is very bright, process 300 can select a smaller set of pixels than when the mobile device is indoors and surroundings are darker. As another example, process 300 can select a greater number of pixels for a mobile device with higher computing and processing capacity versus selecting a smaller number of pixels for a mobile device with lower processing capabilities.

Figure 5A:
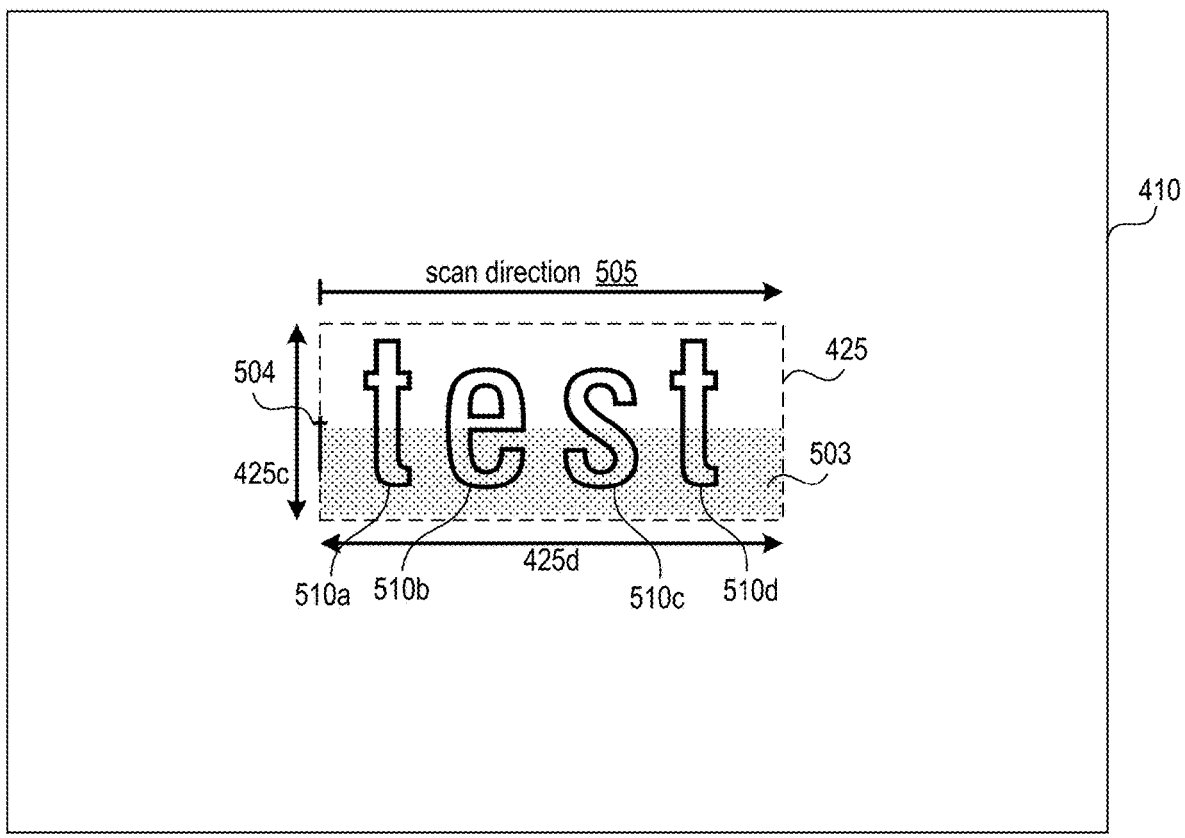
Figure 5B:
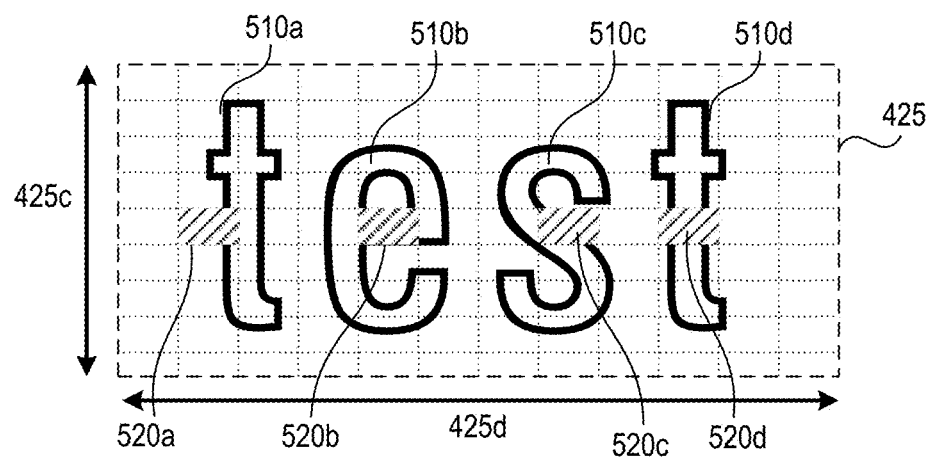
Figure 5C:
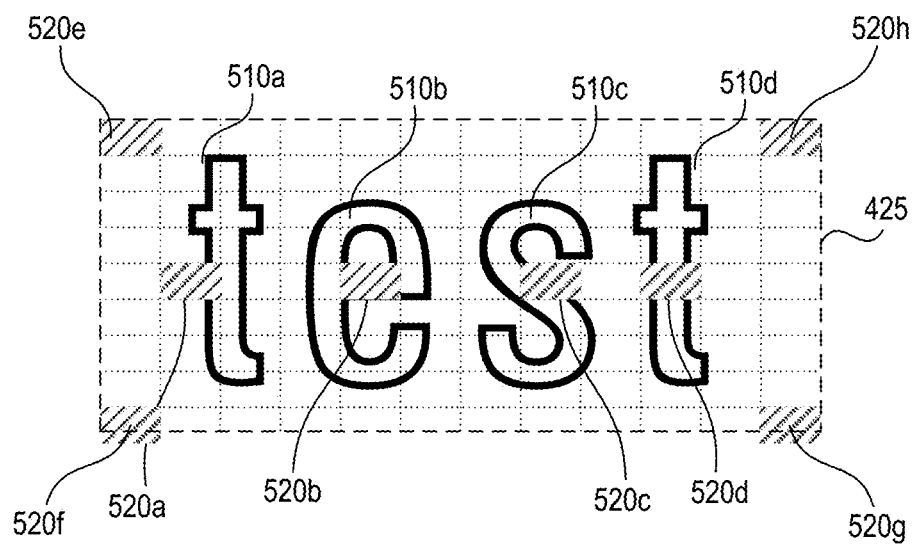
Figure 5D:
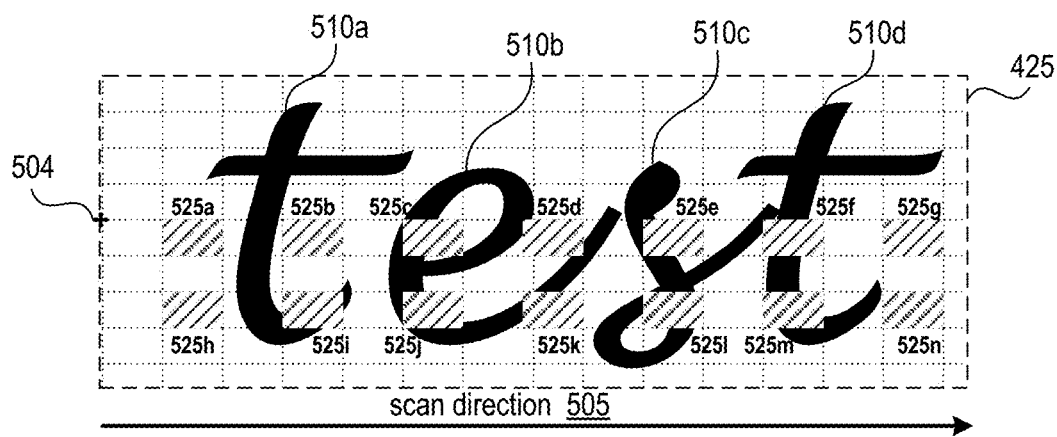

FIGS. 5A-5D illustrate examples of identifying pixels of a display image for a text string overlay. As illustrated in FIG. 5A, for a display foreground of type text string 425, dimensions 425c and 425d, and comprising characters 510a-d, process 300 can first identify the longer side, length 425d. Process 300 can then identify a half-point of the small dimension (width 425c), point 504, and scan down the direction of the longer side: scan direction 505. That is, process 300 selects an initial set of pixels of the base image 410 falling in area 503. Process 300 can further filter the initial set of pixels based on one or more of the following parameters: font of text string, length of text string, width of text string, other artifact types or overlay appearing in the proximity of the text string overlay 425, display properties of text string (for example, color, gradient, brightness, contrast, intensity, etc.), and so on. For example, as illustrated in FIG. 5B, process 300 filters the initial set of pixels of the base image by selecting a pixel 520a, 520b, 520c, and 520d occurring at the center of each character in the text string 510a, 510b, 510c, and 510d, respectively. FIG. 5C illustrates another example of filtering the initial set of pixels by selecting a pixel 520e, 520f, 520g, and 520h at each corner of the overlay 425 in addition to selecting a pixel 520a, 520b, 520c, and 520d occurring at the center of each character. FIG. 5C illustrates another example of filtering the initial set of pixels by selecting every second (or nth) pixel 525a-525n falling in area 503 (FIG. 5A).

Figure 5E:
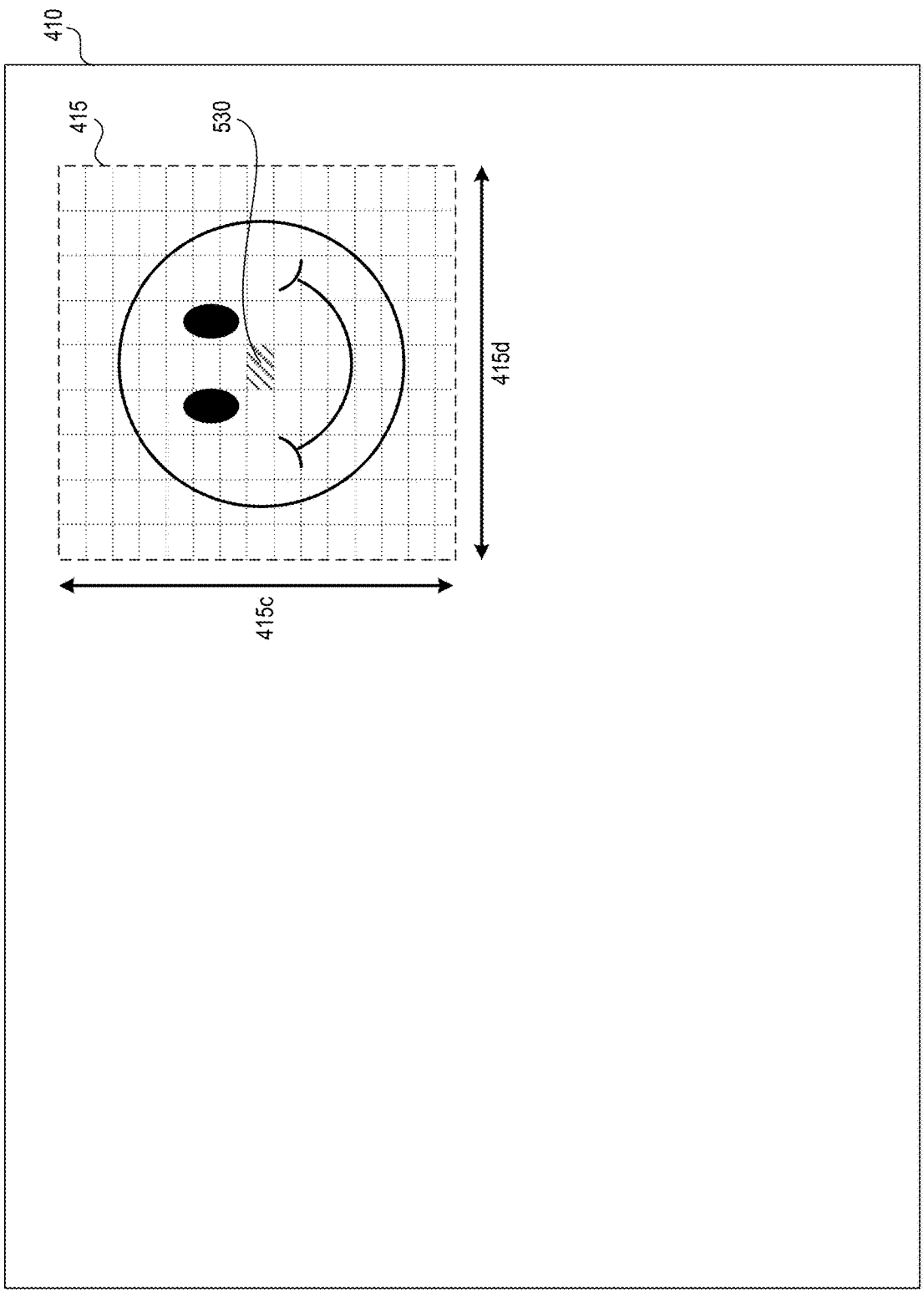

FIG. 5E illustrates an example of identifying pixels of a display image for an emoticon overlay. As illustrated in FIG. 5E, for a display foreground of type emoticon 415 and dimensions 415c and 415d, process 300 selects only one pixel 530 of the display background 410 that coincides with the center of the emoticon overlay 415. Alternatively, as illustrated in FIG. 5F, when process 300 determines that the emoticon overlay's dimensions are larger in proportion to the display background (for example, ratio of overlay dimensions to base image dimensions is more than a particular dimension threshold), process 300 can select additional pixels of the display background, such as two pixels at the center 530 and 531, or a pixel at each of the four corners of the emoticon overlay 532a-d.

Figure 5G:
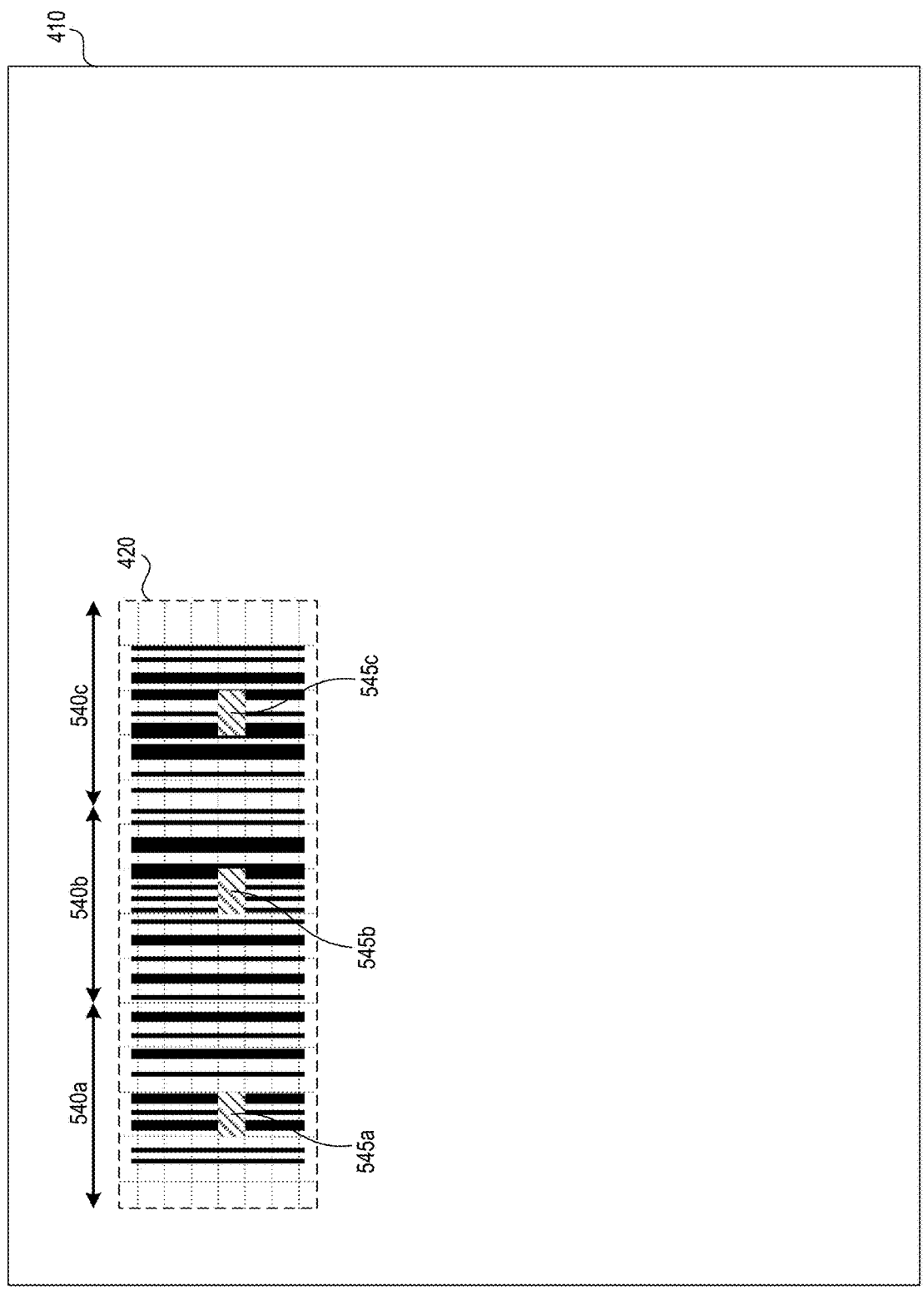

FIG. 5G illustrates an example of identifying pixels of a display image for a barcode overlay. As illustrated in FIG. 5G, for a display foreground of type barcode 420, process 300 can determine that the overlay is more long than wide, and accordingly select a pixel 545a, 545b, and 545c from each of the three quadrants of the barcode 540a, 540b, and 540c, respectively.

Returning to FIG. 3, after identifying the set of pixels of the display background that will be evaluated to compute display property values of the display foreground, process 300 proceeds to block 330 where it retrieves one or more of the following display properties of the pixels in the set: brightness, color, gradient, contrast, luminosity, intensity, density, texture, and so on.

Process 300 proceeds to block 335 where it computes a reference display property value of the display background. To do so, process 300 first computes reference display property values (for example, reference brightness value, reference color value, and so on) for each pixel in the set. For example, process 300 retrieves the red, green, and blue (RGB) color values for each pixel in the set and uses it to compute an aggregated color value of the pixel as follows:

$$\text{aggregate color value}_{pixel} = (\text{color}_{red} * 299) + (\text{color}_{green} * 587) + (\text{color}_{blue} * 114)$$

Process 300 then computes a display property value quotient (for example, a brightness quotient) of the particular pixel by dividing the computed aggregated color value of the pixel by a display property value parameter (for example, a brightness parameter).

$$\text{display property value quotient}_{pixel} = \frac{\text{aggregate color value}_{pixel}}{\text{display property value parameter}(k)}$$

The value of the display property value parameter can depend on one of more of the following factors: an intensity of contrast desired between the display background and the display foreground, transparency of the display foreground on the display background, and so on. For example, process 300 computes a brightness quotient value of the pixel as follows:

$$\text{brightness quotient}_{pixel} = \frac{\text{aggregate color value}_{pixel}}{1000}$$

Process 300 then computes the reference display property value of a particular pixel by comparing the display property value quotient of that particular pixel with one or more display property value thresholds. The display property value threshold values can be based on one or more of the following factors: an intensity of contrast desired between the display background and the display foreground, transparency of the display foreground on the display background, and so on. For example, process 300 can compare the brightness quotient of a particular pixel with a threshold value of 180 to determine if the pixel is to be classified as bright or not:

if brightness quotient$_{pixel}$>180=>reference brightness$_{pixel}$=bright

As another example, process 300 can compare the brightness quotient of a particular pixel with different threshold values to determine an intensity of a pixel's brightness:

if brightness quotient$_{pixel}$>10=>reference brightness$_{pixel}$=bright if brightness quotient$_{pixel}$>140=>reference brightness$_{pixel}$=brighter if brightness quotient$_{pixel}$>180=>reference brightness$_{pixel}$=brightest Process 300 can determine one or more reference display properties of one or more pixels in the set. For example, process 300 determines the brightness, color, and contrast properties of a subset of the set of pixels of the display background. After determining the reference display properties, process 300 computes reference display properties of the display background based on these computed pixel properties. In some embodiments, process 300 computes a reference display property of the display background by averaging the computed reference display property of a subset of the set of pixels of the display background. For example, process 300 computes a reference brightness value of the base image 410 (FIG. 4A) by computing an average of the reference brightness values of pixels 525a-525n (FIG. 5D):

$$\text{reference brightness}_{base\,image} = \frac{\sum_{i=525a}^{525n} \text{reference brightness}_i}{14}$$

In some embodiments, process 300 counts the occurrence of each reference display property value of a subset of the set of pixels of the display background and selects the maximum occurring reference display property value as the reference display property value of the display background. For example, process 300 computes the reference brightness value of the base image 410 (FIG. 4A) to be equal to a maximum occurrence brightness value among the computed brightness values of pixels 520a-520d (FIG. 5B):

reference brightness$_{base\,image}$ =
max(reference brightness$_{525a}$, reference brightness$_{525b}$,
reference brightness$_{525c}$, reference brightness$_{525d}$)

After computing the reference display property values of the display background, process 300 proceeds to block 340 where it uses these values to compute reference display property values of the display foreground.

After all display foregrounds are processed, process 300 proceeds to block 345 where it enables rendering of the display foregrounds on the display backgrounds at the computed display foreground display properties. For example, process 300 adjusts brightness and color of an overlay and transmits the overlay for rendering at a graphical display unit at the computed brightness and color values.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order; and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the methods and system provided herein can be applied to other systems, not necessarily the system described above. The elements, blocks and acts of the various implementations described above can be combined to provide further implementations.

Any patents, applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects may likewise be implemented in a computer-readable medium. Accordingly, the inventors reserve the right to add additional claims after filing the application to pursue such additional claim forms for other aspects of the technology.

We claim:

1. A computer-implemented method for dynamically computing properties of a two-dimensional overlay on an image, the method comprising:
   receiving data comprising a two-dimensional base image and properties of the two-dimensional base image;
   receiving data comprising the two-dimensional overlay and a position of the two-dimensional overlay on the two-dimensional base image;
   identifying a set of pixels of the two-dimensional base image based on the data comprising the two-dimensional overlay and the position of the two-dimensional overlay on the two-dimensional base image,
      wherein the set of pixels comprises pixels situated directly behind at least a portion of the two-dimensional overlay, and
      wherein a number of pixels in the set of pixels varies with varying processing capacity of a device associated with a graphical display unit;
   for each particular pixel in the set of pixels of the two-dimensional base image, computing a brightness value of the particular pixel;
   computing a reference brightness value of the two-dimensional base image based on the computed brightness values of pixels in the set of pixels;
   computing a brightness value of the two-dimensional overlay using the computed reference brightness value of the two-dimensional base image; and
   transmitting the two-dimensional overlay for rendering at the graphical display unit at the computed brightness value of the two-dimensional overlay.

2. The method of claim 1, wherein the properties of the two-dimensional base image comprise:
   length of the two-dimensional base image,
   width of the two-dimensional base image,
   scale of the two-dimensional base image,
   color values of a subset of pixels of the two-dimensional base image, brightness values of the subset of pixels of the two-dimensional base image,
   grayscale values of the subset of pixels of the two-dimensional base image, or
   any combination thereof.

3. The method of claim 1 further comprising:
   identifying or receiving the properties of the two-dimensional overlay, wherein the properties of the two-dimensional overlay comprise:
      type of the two-dimensional overlay,
      length of the two-dimensional overlay
      width of the two-dimensional overlay,
      scale of the two-dimensional overlay,
      color values of a subset of pixels of the two-dimensional overlay,
      brightness values of the subset of pixels of the two-dimensional overlay,
      grayscale values of the subset of pixels of the two-dimensional overlay, or
      any combination thereof.

4. The method of claim 1, wherein the set of pixels of the two-dimensional base image is further identified based on a type of the two-dimensional overlay, and wherein the type of the two-dimensional overlay is:
   text,
   image,
   emoticon,
   barcode,
   matrix barcode, or
   button.

5. The method of claim 1, wherein when the two-dimensional overlay is of a text type, the set of pixels of the two-dimensional base image is further identified based on a font of the two-dimensional overlay.

6. The method of claim 1, wherein the set of pixels of the two-dimensional base image is further identified based on:
   the data comprising the two-dimensional base image,
   the properties of the two-dimensional base image,
   properties of the graphical display unit,
   properties of a mobile device that includes the graphical display unit,
   a telecommunications service provider plan subscribed to by a user of the mobile device,
   properties of the user of the mobile device,
   visual properties of surroundings of the graphical display unit, or
   any combination thereof.

7. The method of claim 1, wherein computing the brightness value of the particular pixel comprises:

computing an aggregated color value of the particular pixel based on a red color value of the particular pixel, a blue color value of the particular pixel, and a green color value of the particular pixel;

computing a brightness quotient of the particular pixel by dividing the computed aggregated color value of the particular pixel by a brightness parameter; and computing the brightness value of the particular pixel by comparing the brightness quotient of the particular pixel with a brightness threshold.

8. The method of claim 7, wherein the brightness parameter is based on:
an intensity of contrast desired between the two-dimensional base image and the two-dimensional overlay,
transparency of the two-dimensional overlay on the two-dimensional base image, or
any combination thereof.

9. The method of claim 7, wherein the brightness threshold is based on:
an intensity of contrast desired between the two-dimensional base image and the two-dimensional overlay,
transparency of the two-dimensional overlay on the two-dimensional base image, or any combination thereof.

10. The method of claim 1, wherein computing the reference brightness value of the two-dimensional base image further comprises:
computing an average of the computed brightness values of pixels in the set of pixels.

11. The method of claim 1, wherein the reference brightness value of the two-dimensional base image equals a maximum occurrence brightness value among the computed brightness values of pixels in the set of pixels.

12. At least one non-transitory, computer-readable medium carrying instructions, which when executed by at least one data processor, performs operations for dynamically computing properties of a display foreground on a display background, the operations comprising:
receiving data comprising the display background and properties of the display background;
receiving data comprising the display foreground and a position of the display foreground on the display background;
identifying a set of pixels of the display background based on the data comprising the display foreground and the position of the display foreground on the display background,
wherein the set of pixels comprises pixels situated directly behind at least a portion of the display foreground, and
wherein a number of pixels in the set of pixels varies with varying processing capacity of a device associated with a graphical display unit;
for each particular pixel in the set of pixels of the display background, computing a value of a display property of the particular pixel;
computing a reference display property value of the display background based on the computed display property values of pixels in the set of pixels;
computing a display property value of the display foreground using the computed reference display property value of the display background; and
adjusting the display property of the display foreground based on the computed display property value of the display foreground.

13. The at least one non-transitory, computer-readable medium of claim 12, wherein the display property comprises: brightness, color, contrast, luminosity, intensity, or any combination thereof.

14. The at least one non-transitory, computer-readable medium of claim 12, wherein the properties of the display background comprise:
length of the display background,
width of the display background,
scale of the display background,
color values of a subset of pixels of the display background,
brightness values of the subset of pixels of the display background,
grayscale values of the subset of pixels of the display background, or
any combination thereof.

15. The at least one non-transitory, computer-readable medium of claim 12, wherein the operations further comprise:
identifying or receiving the properties of the display foreground, wherein the properties of the display foreground comprise:
type of the display foreground,
length of the display foreground,
width of the display foreground,
scale of the display foreground,
color values of a subset of pixels of the display foreground,
brightness values of the subset of pixels of the display foreground,
grayscale values of the subset of pixels of the display foreground, or
any combination thereof,
wherein the set of pixels of the display background is further identified based on the properties of the display foreground.

16. The at least one non-transitory, computer-readable medium of claim 12,
wherein the set of pixels of the display background is further identified based on:
the data comprising the display background,
the properties of the display background,
properties of the graphical display unit,
properties of a mobile device that includes the graphical display unit,
a telecommunications service provider plan subscribed to by a user of the mobile device,
properties of the user of the mobile device,
visual properties of surroundings of the graphical display unit,
a type of the display foreground, or
any combination thereof,
wherein the type of the display foreground is: text, image, emoticon, barcode, matrix barcode, or button, and
wherein when the display foreground is of a text type, the set of pixels of the display background is further identified based on a font associated with the display foreground.

17. The at least one non-transitory, computer-readable medium of claim 12, wherein computing the display property value of the particular pixel comprises:
computing an aggregated color value of the particular pixel;

computing a display property value quotient of the particular pixel by dividing the computed aggregated color value of the particular pixel by a display property value parameter; and computing the display property value of the particular pixel by comparing the display property value quotient of the particular pixel with a display property value threshold.

18. The at least one non-transitory, computer-readable medium of claim 17, wherein the display property value parameter, the display property value threshold, or both are based on:

an intensity of contrast desired between the display background and the display foreground, transparency of the display foreground on the display background, or any combination thereof.

19. The at least one non-transitory, computer-readable medium of claim 12, wherein the reference display property value of the display background equals a maximum occurrence display property value among the computed display property values of pixels in the set of pixels.

20. A computer-implemented method for dynamically computing properties of an two-dimensional overlay on an image, the method comprising:

receiving data comprising a two-dimensional base image and properties of the two-dimensional base image;

receiving data comprising the two-dimensional overlay and a position of the two-dimensional overlay on the two-dimensional base image;

identifying a set of pixels of the two-dimensional base image based on the data comprising the two-dimensional overlay and the position of the two-dimensional overlay on the two-dimensional base image, wherein the set of pixels comprises pixels situated under at least a portion of the two-dimensional overlay, and wherein a number of pixels in the set of pixels varies with varying processing capacity of a device associated with a graphical display unit;

for each particular pixel in the set of pixels of the two-dimensional base image, computing a value of a display property of the particular pixel, wherein the display property comprises: brightness, color, contrast, luminosity, intensity, or any combination thereof;

computing a reference display property value of the two-dimensional base image based on the computed display property values of pixels in the set of pixels;

computing a display property value of the two-dimensional overlay using the computed reference display property value of the two-dimensional base image; and assigning the display property of the two-dimensional overlay based on the computed display property value of the two-dimensional overlay.

* * * * *